(12) United States Patent
Coleman et al.

(10) Patent No.: US 8,342,575 B2
(45) Date of Patent: Jan. 1, 2013

(54) SKI TIP CONNECTOR

(75) Inventors: R. Scott Coleman, Ogden, UT (US);
David O. Meyers, Kaysville, UT (US)

(73) Assignee: Hookease IP Holdings, LLC, Ogden, UT (US)

( * ) Notice: Subject to any disclaimer, the term of this patent is extended or adjusted under 35 U.S.C. 154(b) by 134 days.

(21) Appl. No.: 13/100,027

(22) Filed: May 3, 2011

(65) Prior Publication Data

US 2012/0242071 A1  Sep. 27, 2012

Related U.S. Application Data

(60) Provisional application No. 61/467,460, filed on Mar. 25, 2011.

(51) Int. Cl.
*A63C 11/00* (2006.01)

(52) U.S. Cl. .............................. 280/818; 280/809; 24/298

(58) Field of Classification Search .................. 280/809, 280/817, 818; 24/298, 300, 301, 302; 403/110, 403/289, 290, 321, 373, 374.1
See application file for complete search history.

(56) References Cited

U.S. PATENT DOCUMENTS

| | | | | |
|---|---|---|---|---|
| 3,703,299 A | * | 11/1972 | Kutchma | 280/818 |
| 3,907,320 A | * | 9/1975 | Charneck | 280/818 |
| D249,816 S | | 10/1978 | Zelle | |
| D264,985 S | | 6/1982 | Haber et al. | |
| 4,460,344 A | | 7/1984 | Notermann | |
| 4,936,603 A | | 6/1990 | Reynaud | |
| 4,981,455 A | | 1/1991 | Tubens | |
| D348,034 S | | 6/1994 | Mann | |
| D366,083 S | | 1/1996 | Zemke | |
| 5,531,480 A | * | 7/1996 | Foertsch | 280/818 |
| 7,052,044 B1 | | 5/2006 | Streeter | |
| 2011/0109072 A1 | * | 5/2011 | Ligouri et al. | 280/818 |

OTHER PUBLICATIONS

Design U.S. Appl. No. 29/392,280 Notice of Allowance mailed Sep. 30, 2011.

* cited by examiner

*Primary Examiner* — John Walters
(74) *Attorney, Agent, or Firm* — Maschoff Gilmore & Israelsen

(57) ABSTRACT

In some embodiments, a tip fastener configured to removably attach to a tip of a snow ski includes a clamp, a lever and a push link. The clamp includes a base and opposing upper and lower jaws extending from the base. The lever is rotatably coupled to the clamp. The push link is rotatably coupled to the clamp and is rotatably coupled to the lever.

20 Claims, 9 Drawing Sheets

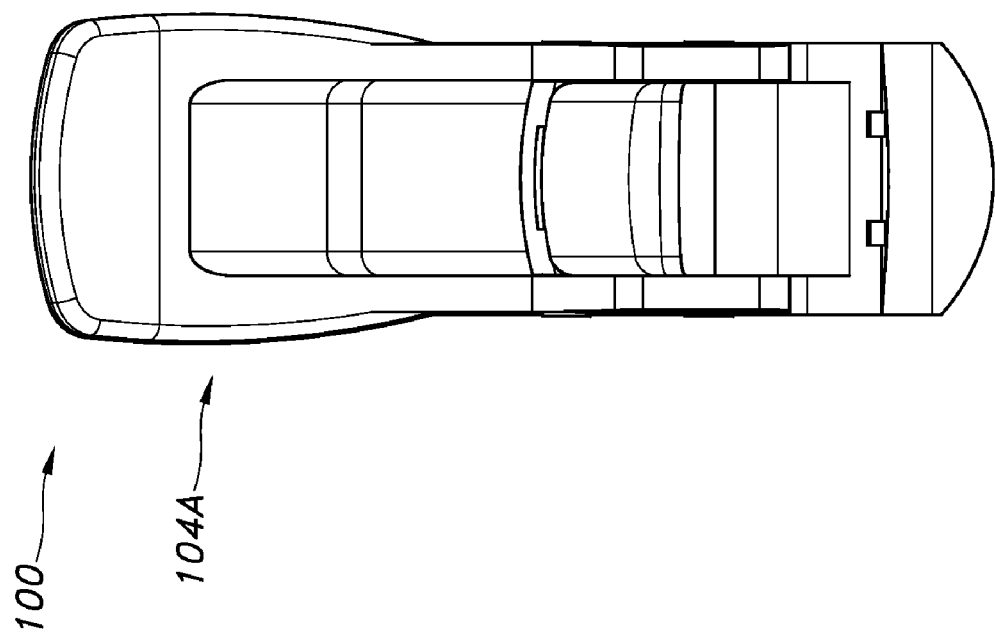

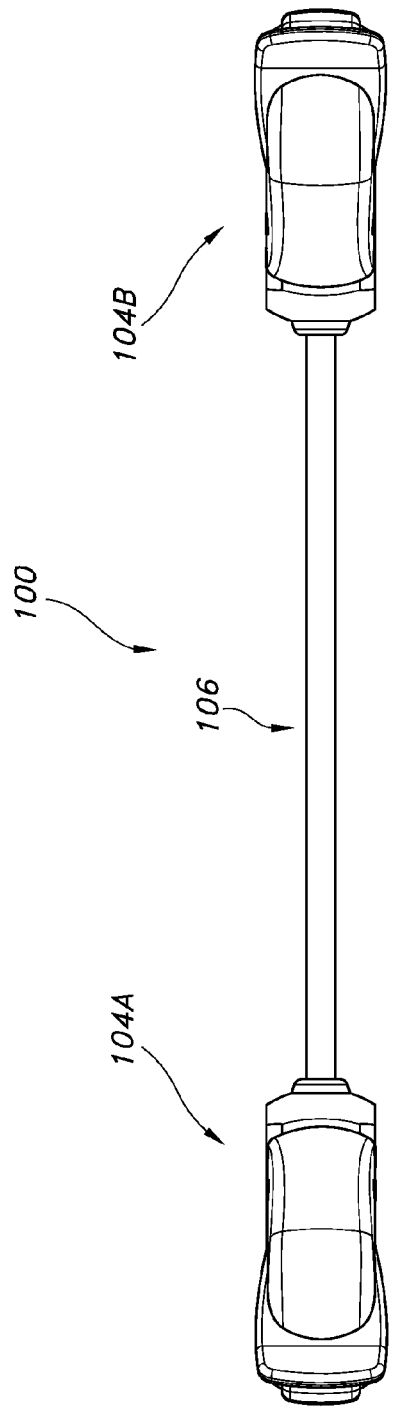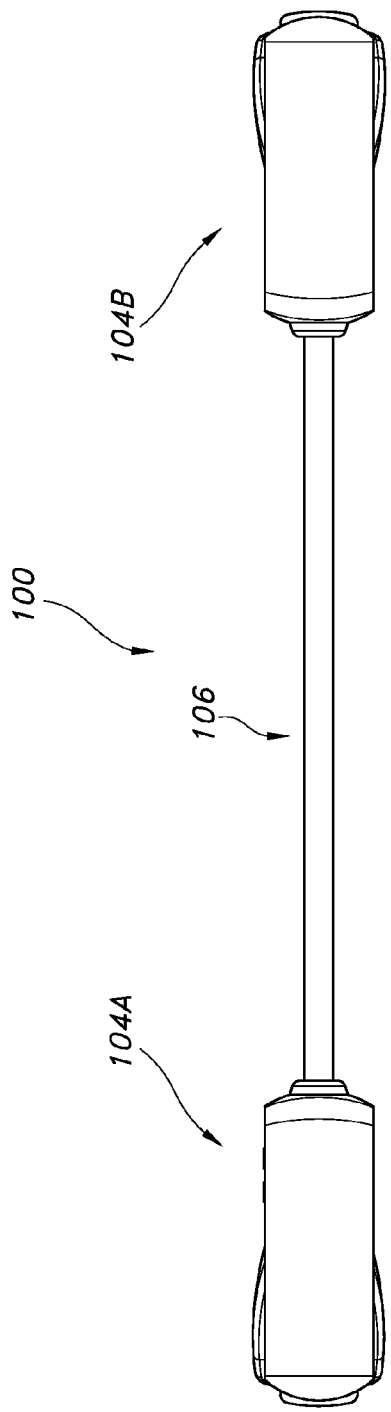

SKI TIP CONNECTOR

CROSS-REFERENCE TO RELATED APPLICATIONS

The present application claims the benefit of and priority to U.S. Provisional Patent Application No. 61/467,460, filed Mar. 25, 2011 and entitled SKI TIP CONNECTOR, which application is herein incorporation by reference in its entirety.

BACKGROUND

1. Field of the Invention

Embodiments disclosed herein generally relate to instructional devices for beginning skiers. More particularly, some example embodiments relate to a tip connector device configured to connect the tips of two snow skis together.

2. Related Technology

Beginning snow skiers often have difficulty learning to keep the front tips of their skis together. Keeping the front tips together can be important to maintain control. For instance, if the front tips cross over each other, it can cause the beginning skier to lose control and fall. As another example, the front tips may spread apart as the beginning skier traverses a ski slope, causing the beginning skier to do the splits and fall.

Although teaching styles have varied through time and from one ski slope to another, most skiers begin by mastering the snowplow, also known as the wedge, before learning to keep their skis parallel. The snowplow position has the front tips of the skis pointing inward with the back tips of the skis, also known as the tails, spread further apart than the front tips. In this position, the skier tends to lace more weight on the inner edges of the skis, resulting in a controlled descent of the ski slope. In the snowplow position, the angle made between the skis may be useful to control the skier's speed and/or to stop. A relatively wider angle between the skis will traverse the slope slower than a relatively narrower angle between the skis.

One common device for teaching beginning skiers to keep their ski tips together to form a wedge is known as the Edgy Wedgy. The Edgy Wedgy includes a hose with screw clamps on each end. Each screw clamp fastens to a different one of the ski tips with the hose lying between the skis to keep the front tips closer together than the back tips of the skis. Each screw clamp includes a thumbscrew that can be relatively difficult to tighten sufficiently to avoid one or both of the screw clamps inadvertently becoming unfastened from one or both skis. Vibrations and cold weather can also cause the screw clamps to inadvertently become unfastened from the skis.

Other devices for teaching beginning skiers to keep their ski tips together include adhesive strips, hook and loop fasteners, straps and/or buckles. Many of these devices involve an excessive number of components, rendering them expensive, cumbersome, unattractive and/or difficult to operate under winter conditions. Some devices are also limited for use with skis that have one or more apertures formed in the ski tips.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Some example embodiments relate to a tip connector device configured to connect the tips of two snow skis together. The tip connector device may include two tip fasteners and a connecting member coupled therebetween.

In one example embodiment, a tip fastener configured to removably attach to a tip of a snow ski includes a clamp, a lever and a push link. The clamp includes a base and opposing upper and lower jaws extending from the base. The lever is rotatably coupled to the clamp. The push link is rotatably coupled to the clamp and is rotatably coupled to the lever.

In another example embodiment, a tip connector device includes a connecting member, a first tip fastener and a second tip fastener. The connecting member includes opposing first and second ends. The first tip fastener is coupled to the first end of the connecting member. The second tip fastener is coupled to the second end of the connecting member. Each of the first and second tip fasteners includes a clamp, a lever and a push link. The lever is rotatably coupled to the clamp. The push link is rotatably coupled to the clamp and is rotatably coupled to the lever.

In yet another example embodiment, a tip connector device includes a connecting member, a first tip fastener and a second tip fastener. The connecting member includes opposing first and second ends. The first tip fastener is coupled to the first end of the connecting member and includes a first clamp, a first lever, a first push link, a first pivot pin, a second pivot pin and a third pivot pin. The first clamp includes a base and opposing upper and lower jaws extending from the base of the first clamp. The first lever is rotatably coupled to the first clamp. The first push link is rotatably coupled to the first clamp and is rotatably coupled to the first lever. The first pivot pin rotatably couples the first lever to the first clamp. The second pivot pin rotatably couples the first push link to the first lever. The third pivot pin rotatably couples the first push link to the upper jaw of the first clamp. The second tip fastener is coupled to the second end of the connecting member and includes a second clamp, a second lever, a second push link, a fourth pivot pin, a fifth pivot pin and a sixth pivot pin. The second clamp includes a base and opposing upper and lower jaws extending from the base of the second clamp. The second lever is rotatably coupled to the second clamp. The second push link is rotatably coupled to the second clamp and is rotatably coupled to the second lever. The fourth pivot pin rotatably couples the second lever to the second clamp. The fifth pivot pin rotatably couples the second push link to the second lever. The sixth pivot pin rotatably couples the second push link to the upper jaw of the second clamp.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 2A-2E respectively show a perspective view, a front view, an end view, a top view and a bottom view of the tip connector device of FIG. 1 including the connecting member and first and second tip fasteners;

DETAILED DESCRIPTION OF SOME EXAMPLE EMBODIMENTS

Some embodiments disclosed herein include a tip connector device configured to connect the tips of two snow skis together. In some embodiments, the tip connector device includes a first tip fastener, a second tip fastener, and a connecting member coupled between the first and second tip fasteners. The first and second tip fasteners may be coupled to opposing first and second ends of the connecting member. Moreover, each of the first and second tip fasteners may be configured to be removably attached to a different one of a pair of skis of a skier. When the first and second tip fasteners are connected to respective ones of the skier's skis with the connecting member extending therebetween, the tip connector device may be configured to substantially prevent the skier's ski tips from spreading apart from or crossing over each other.

Reference will now be made to the drawings to describe various aspects of some example embodiments of the invention. It is to be understood that the drawings are diagrammatic and schematic representations of such exemplary embodiments, and are not limiting of the present invention, nor are they necessarily drawn to scale.

Figure 1:
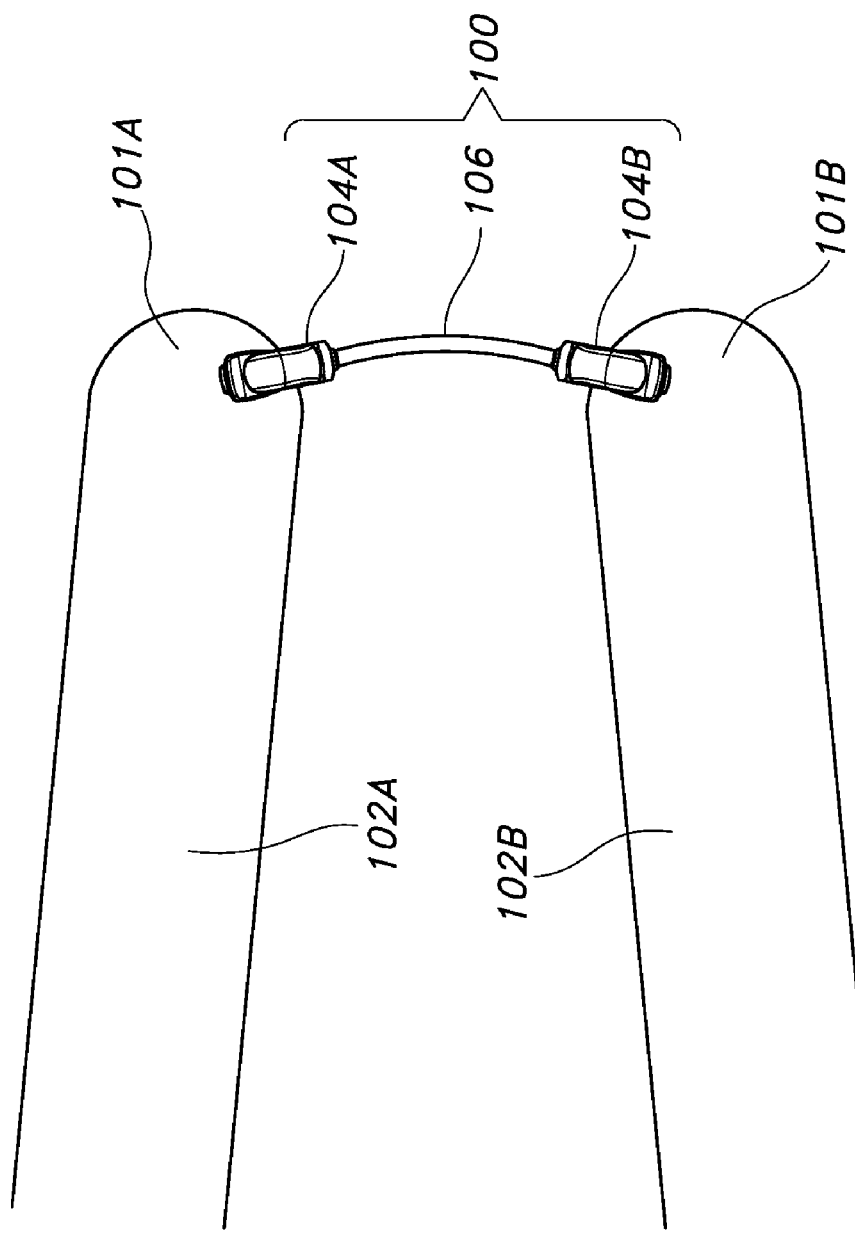
FIG. 1 shows a tip connector device configured to connect respective tips of two snow skis together, the tip connector device including a connecting member and first and second tip fasteners.

FIG. 1 shows a tip connector device 100 configured to connect respective tips 101A, 101B of two snow skis 102A, 102B together, arranged in accordance with at least some embodiments described herein. The tips 101A, 101B may be collectively referred to hereinafter as "ski tips 101," and the skis 102A, 102B may be collectively referred to hereinafter as "skis 102"). The skis 102 include a first or left ski 102A, and a second or right ski 102B. Although FIG. 1 illustrates the tip connector device 100 as being connected to a respective front tip 101A, 101B of each of skis 102, in other embodiments, the tip connector device 100 may be connected to a respective back tip of each of skis 102, or at other locations along the respective lengths of skis 102.

In the illustrated embodiment, the tip connector device 100 includes a first tip fastener 104A, a second tip fastener 104B, and a connecting member 106 coupled between the first and second tip fasteners 104A, 104B (collectively referred to hereinafter as "tip fasteners 104"). With the tip fasteners 104 connected to respective ones of the skis 102, the tip connector device 100 may substantially prevent the connected ski tips 101 of skis 102 from spreading apart from each other, and/or from crossing over each other.

Figure 2A:
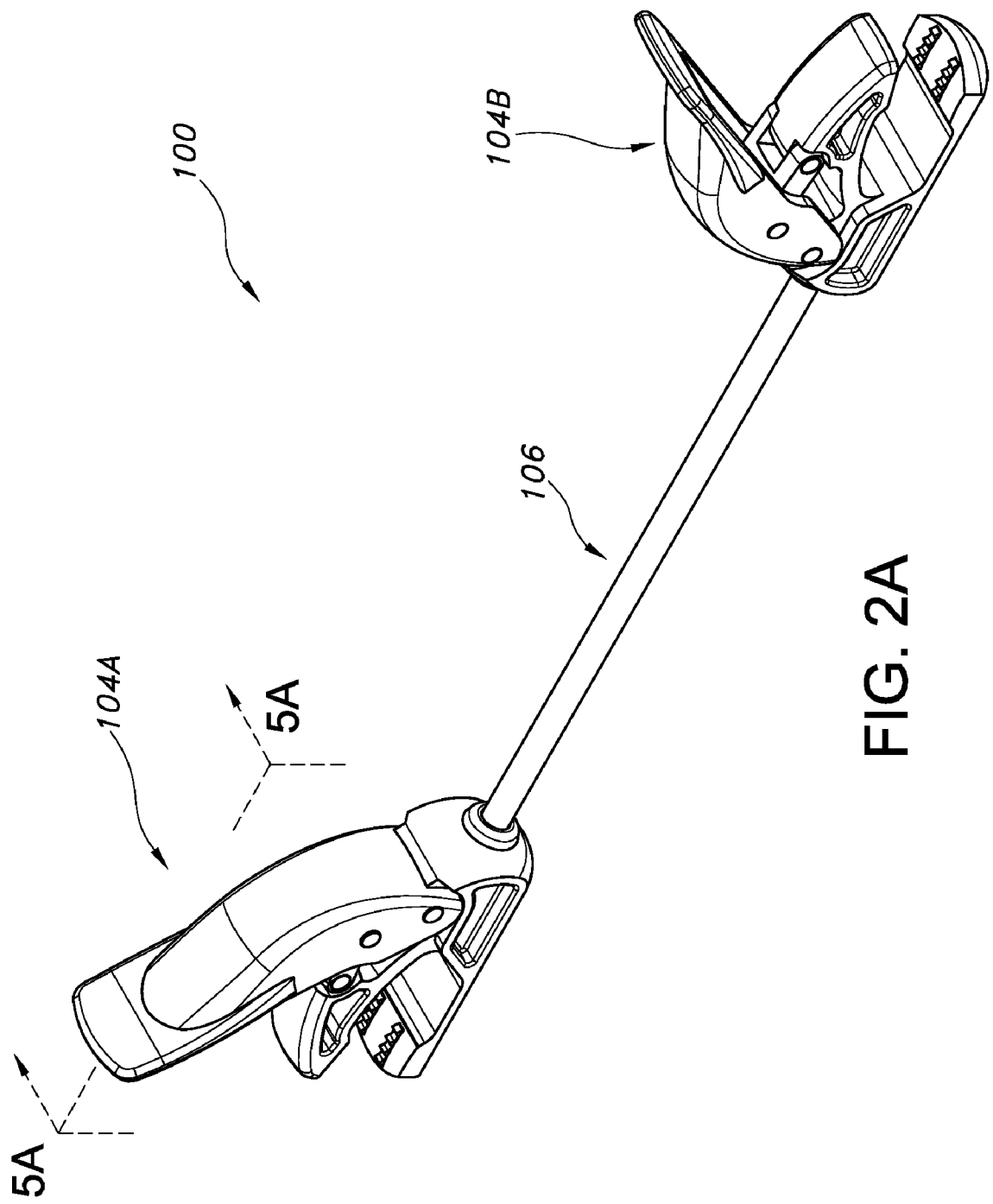
Figure 2B:
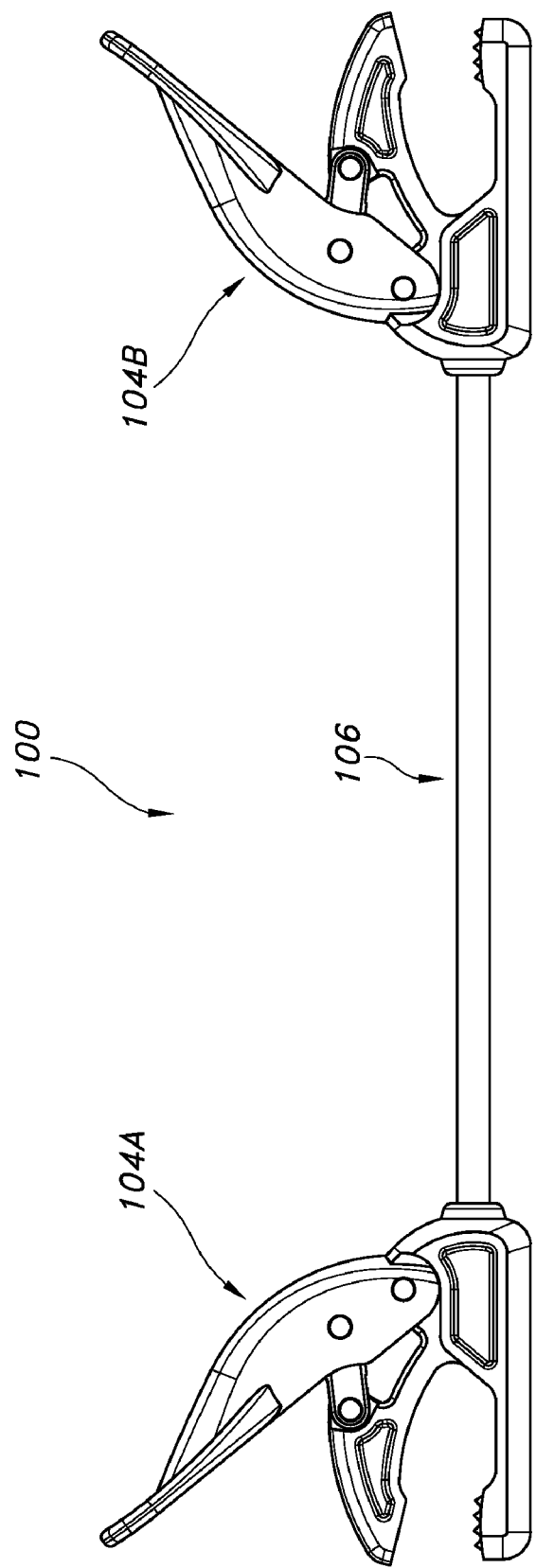

FIGS. 2A-2E respectively show a perspective view, a front view, an end view, a top view and a bottom view of the tip connector device 100 of FIG. 1, arranged in accordance with at least some embodiments described herein. Although a back view of the tip connector device 100 has not been provided, the symmetry of the tip connector device 100 is such that a back view of the tip connector device 100 would be substantially identical to the front view of FIG. 2B. Additionally, while FIG. 2C shows an end view in which only the first tip fastener 104A is visible, the tip fasteners 104 may be substantially identical such that an end view in which only the second tip fastener 104B is visible would be substantially identical to the end view of FIG. 2C. Accordingly, neither a back view of the tip connector device 100 nor an end view in which only the second tip fastener 104B is visible have been provided in the Figures.

Figure 3:
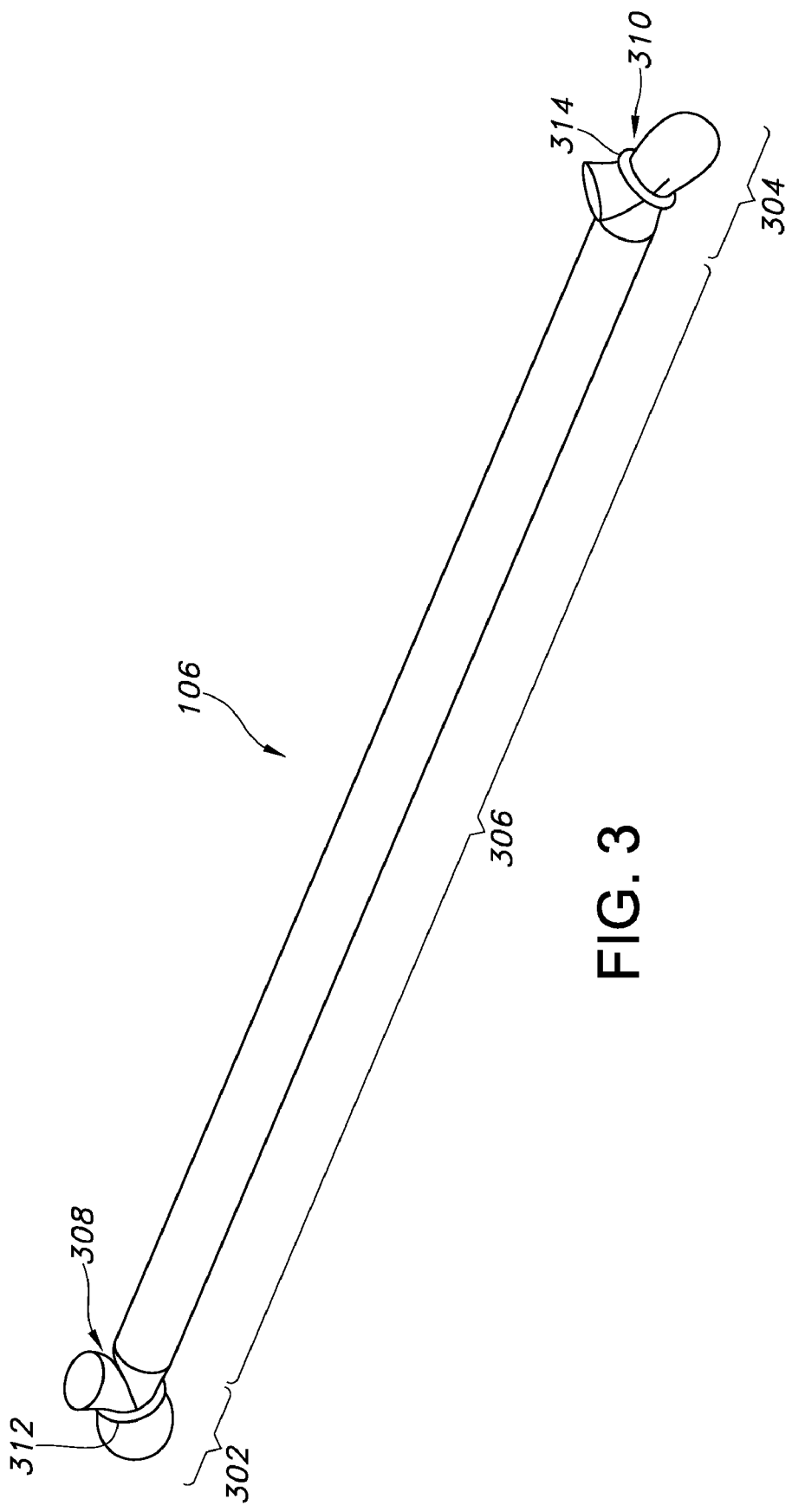
FIG. 3 shows a perspective view of the connecting member of FIG. 1.

FIG. 3 shows a perspective view of the connecting member 106 of FIG. 1. The connecting member 106 may include a first end 302, a second end 304 opposing the first end 302, and an elongate middle portion 306.

In the illustrated embodiment, each of the first and second ends 302, 304 may have a cross-sectional diameter that is larger than a cross-sectional diameter of the middle portion 306. The relatively larger cross-sectional diameter of the first and second ends 302, 304 may serve to couple the tip connectors 104 to the first and second ends 302, 304 as discussed in additional detail below. The relatively larger cross-sectional diameter of the first and second ends 302, 304 may be obtained by forming a doubled-over configuration 308, 310 in each of the first and second ends 302, 304, respectively. In these and other embodiments, rings 312, 314 may be provided to maintain first and second ends 302, 304 in the respective doubled-over configurations 308, 310.

In other embodiments, the relatively larger cross-sectional diameter of the first and second ends 302, 304 may be obtained by providing knots in the first and second ends 302, 304.

While the first and second ends 302, 304 may each have a relatively larger cross-sectional diameter than the middle portion 306 to couple the tip connectors 104 to the first and second ends 302, 304, any other suitable configuration can be employed to couple the tip connectors 104 to the first and second ends 302, 304. For instance, adhesives may be used.

The connecting member 106 may include an at least partially elastic material, such as elastic cord, or a substantially non-elastic material, such as a metal cable. As used herein, an elastic material is a material configured to elastically deform in at least one dimension. For instance, the connecting member 106 may be elastically deformable along its longitudinal axis.

Alternately or additionally, the connecting member may include an at least partially pliable material, such as a leather strap, or a substantially non-pliable or rigid material, such as a metal or wooden dowel. As used herein, a pliable material is a material configured to be easily bent without breaking.

Accordingly, the connecting member may include, but is not limited to, elastic cord (e.g., bungee cord), surgical tubing, metal cable or wire, a rope made of natural or synthetic fibers, a strap made of fabric or leather, a dowel made of wood, metal or synthetic material(s), or the like or any combination thereof.

Figure 4:
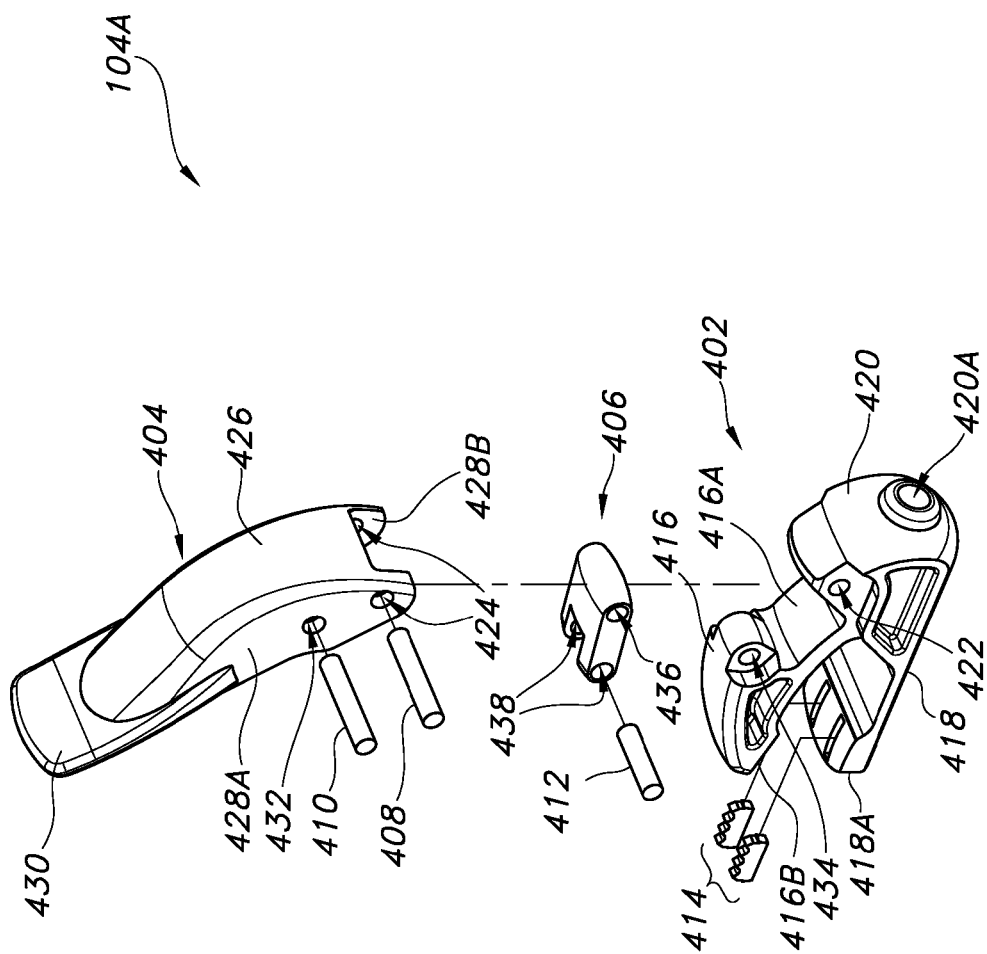
FIG. 4 shows an exploded perspective view of the first tip fastener of FIG. 1.

FIG. 4 shows an exploded perspective view of the first tip fastener 104A of FIG. 1, arranged in accordance with at least some embodiments described herein. The second tip fastener 104B may be similarly configured and/or substantially identical to the first tip fastener 104A such that the description below pertaining to the first tip fastener 104A may apply to the second tip fastener 104B as well.

The first tip fastener 104A may include any one or more of a variety of materials. The components of the first tip fastener 104A may include the same materials, or some of the components may include a first material(s) while other components include a second material(s), and so on. Accordingly, the first tip fastener 104A may include, but is not limited to, natural or synthetic plastic or polymer such as Nylon, metal such as stainless steel, galvanized steel or aluminum, or other suitable material(s).

In the illustrated embodiment of FIG. 4, the first tip fastener 104A includes a clamp 402, a lever 404, and a push link 406. In some embodiments, the first tip fastener 104A further includes first, second and third pivot pins 408, 410, 412 and one or more sets of teeth 414. Although not required, in some embodiments, the clamp 402, lever 404, push link 406, first pivot pin 408, second pivot pin 410 and third pivot pin 412 include a synthetic polymer, such as polyamide, or more particularly, Nylon, while the sets of teeth 414 include a metal, such as stainless steel or aluminum.

The clamp 402 includes opposing upper and lower jaws 416, 418 extending from a base 420. In these and other embodiments, the first tip fastener 104A may be configured to removably secure the ski tip 101A of the first ski 102A between the upper and lower jaws 416, 418 of the first tip fastener 104A, while the second tip fastener 104B may be similarly configured to removably secure the ski tip 101B of the second ski 102B between corresponding upper and lower jaws 416, 418 of the second tip fastener 104B.

According to some embodiments, the upper jaw 416 includes an arm 416A connecting a distal end 416B of the upper jaw 416 to the base 420. The arm 416A may be at least partially flexible and/or resilient to facilitate operation of the first tip fastener 104A as explained below.

The base 420 of the clamp 402 defines a receptacle 420A configured to receive an end of the connecting member 106. In particular, the receptacle 420A defined in the base 420 may be configured to receive the first end 302 of the connecting member 106 of FIG. 3.

In the embodiment of FIG. 4, the two sets of teeth 414 are included in a distal end 418A of the lower jaw 418. Each set of teeth 414 includes four teeth in the illustrated embodiment; however, each set of teeth 414 may more generally include as few as one tooth up to five or more teeth. Moreover, while the example of FIG. 4 includes two sets of teeth disposed in the distal end 418A of lower jaw 418, in other embodiments, the first tip fastener 104A may include more or fewer than two sets of teeth 414 disposed in the distal end 418A of the lower jaw 418. Alternately or additionally, the first tip fastener 104A may include one or more sets of teeth 414 disposed in the distal end 416B of the upper jaw 416.

Each of the set of teeth 414 may be integrally formed with the clamp 402. In these and other embodiments, each set of teeth 414 may include natural or synthetic plastic or polymer such as Nylon, or other suitable material(s). Alternately, each of the set of teeth 414 may be overmolded into the clamp 402, adhered to the clamp 402, or otherwise coupled to the clamp 402. In these and other embodiments, each set of teeth 414 may include stainless steel, galvanized steel, aluminum, or other suitable material(s). According to some embodiments, each set of teeth 414 may be configured to securely grip or otherwise engage a corresponding ski to which the first tip fastener 104A is removably attached.

The lever 404 may be rotatably coupled to the clamp 402. In these and other embodiments, the base 420 of the clamp 402 defines a base hole 422 and the lever 404 defines a first lever hole pair 424. Accordingly, the first pivot pin 408 may be positioned in the first lever hole pair 424 and the base hole 422 to rotatably couple the lever 404 to the clamp 402.

The lever 404 may include a substantially arcuate top portion 426, two sides 428A, 428B extending from the top portion 426, and a tab 430 extending from the top portion 426. Each of the sides 428A, 428B defines a respective one of the holes included in the first lever hole pair 424. In addition, each of the sides 428A, 428B defines a respective one of two holes included in a second lever hole pair 432. In FIG. 4, only one of the two holes included in the second lever hole pair 432, e.g., the hole defined in the side 428A, is visible.

In some embodiments, the tab 430 of lever 404 may be manipulated by a user during operation of the first tip fastener 104A.

The push link 406 may be rotatably coupled to the clamp 402 and may also be rotatably coupled to the lever 404. In these and other embodiments, the upper jaw 416 of clamp 402 defines an upper jaw hole 434 and the push link 406 defines both a first push link hole 436 and a second push link hole pair 438. Accordingly, the second pivot pin 410 may be positioned in the second lever hole pair 432 and the first push link hole 436 to rotatably couple the push link 406 to the lever 404, and the third pivot pin 412 may be positioned in the second push link hole pair 438 and the upper jaw hole 434 to rotatably couple the push link 406 to the clamp 402.

Figure 5A:
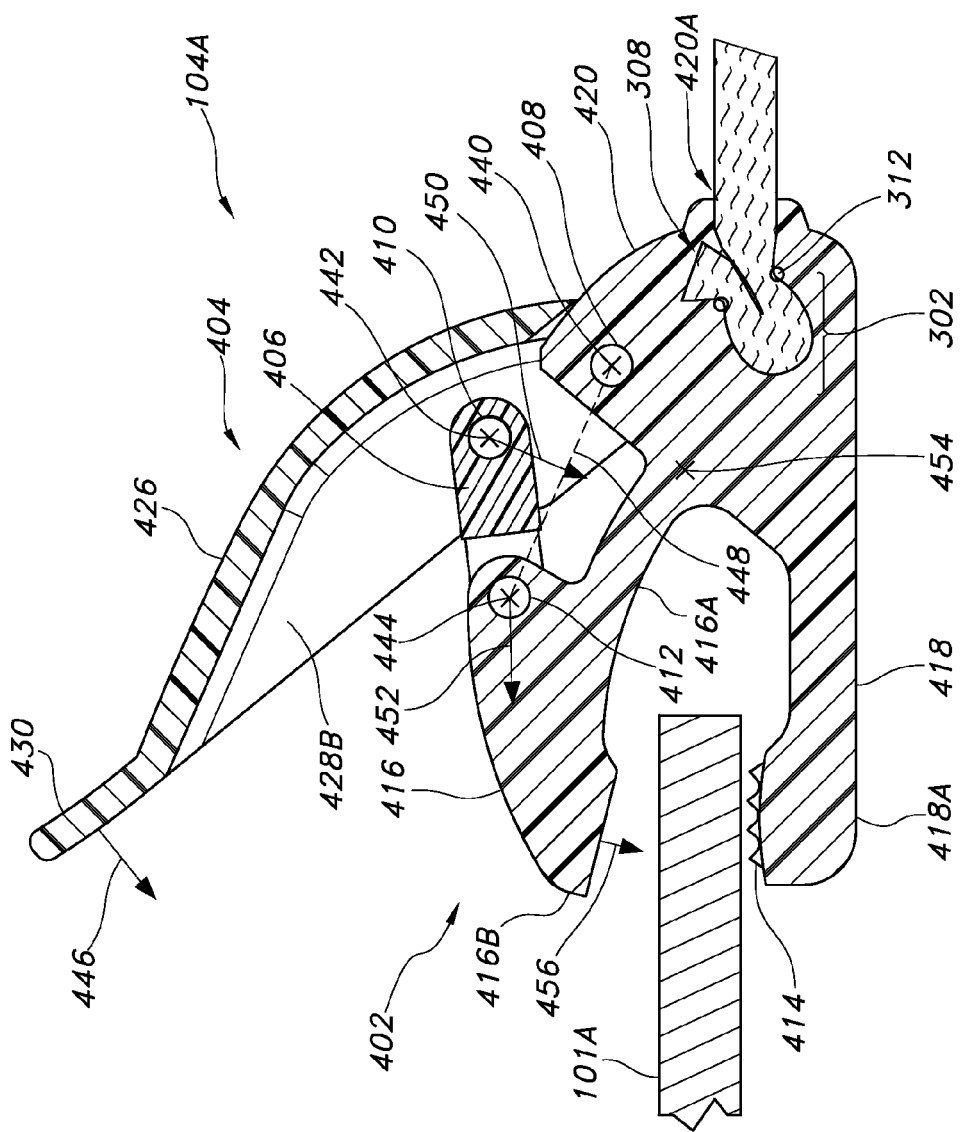
FIG. 5A shows a cross-sectional view of the first tip fastener of FIG. 2A along cutting plane line 5A-5A of FIG. 2A and arranged in an open position.

FIG. 5A shows a cross-sectional view of the first tip fastener 104A of FIG. 2A along cutting plane line 5A-5A of FIG. 2A, arranged in accordance with at least some embodiments described herein. In FIG. 5A, the tip fastener 104A is arranged in an "open" position suitable for inserting the ski tip 101A of ski 102A between the distal ends 416B, 418A of upper and lower jaws 416, 418 when removably coupling the first tip fastener 104A to the ski tip 101A. The open position shown in FIG. 5A may also be suitable for removing the ski tip 101A of ski 102A from between the distal ends 416B, 418A of upper and lower jaws 416, 418 when detaching the first tip fastener 104A from the ski tip 101A.

Figure 5B:
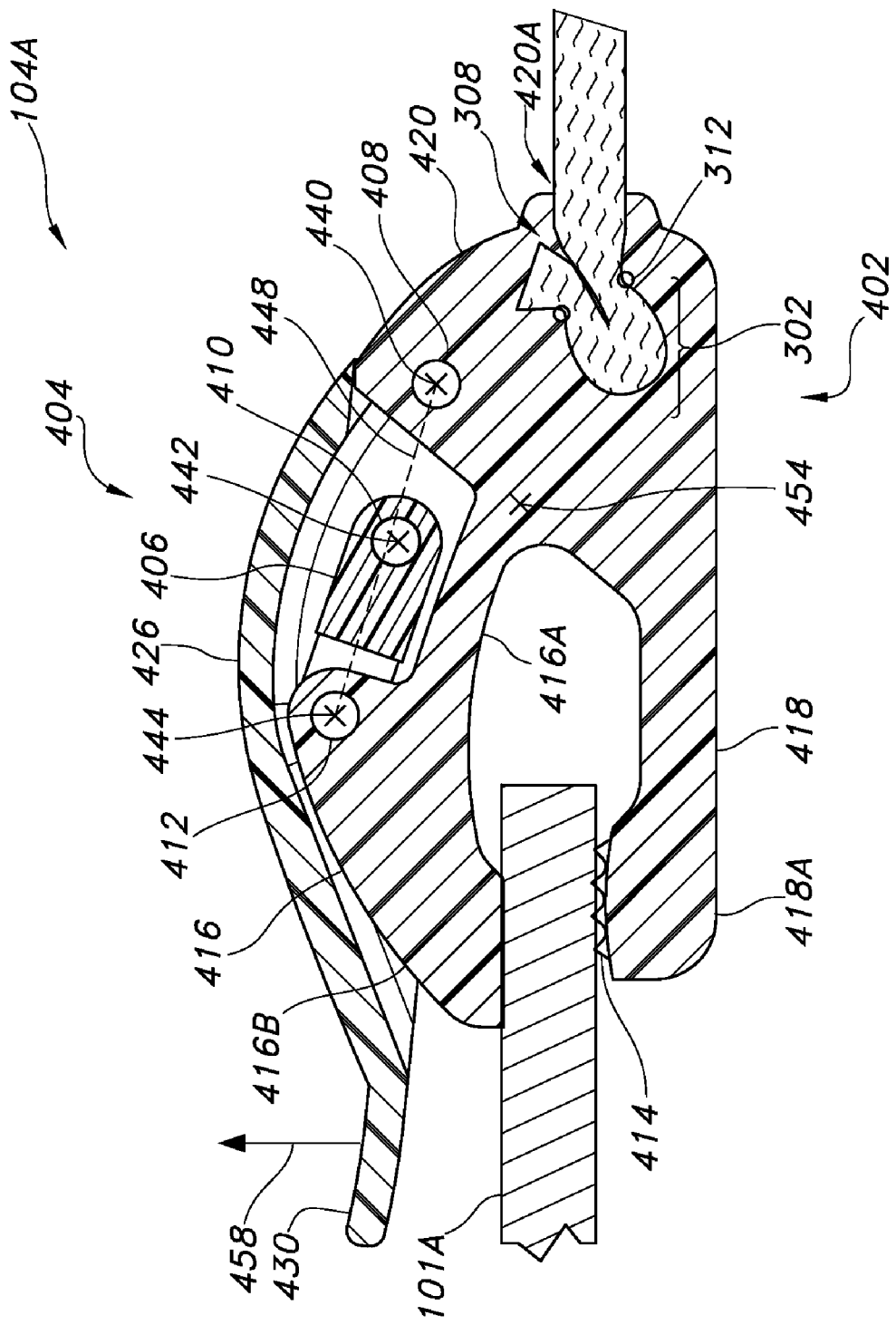
FIG. 5B shows a cross-sectional view of the first tip fastener of FIG. 5A arranged in a "closed" position, all arranged in accordance with at least some embodiments described herein.

FIG. 5B shows a cross-sectional view of the first tip fastener 104A of FIG. 5A in a "closed" position, arranged in accordance with at least some embodiments described herein. In the closed position depicted in FIG. 5B, the first tip fastener 104A may be securely coupled to the ski tip 101A. Additional details regarding features of the first tip fastener 104A will now be provided with respect to FIGS. 5A and 5B.

As previously mentioned the first end 302 of the connecting member 106 (FIG. 3) may be received in the receptacle 420A defined in the base 420. For instance, the base 420 may be overmolded onto the first end 302 of the connecting member 106 to connect the first tip fastener 104A to the connecting member 106. Alternately or additionally, to connect the first tip fastener 104A to the first end 104A of the connecting member 106, a hole may be formed, e.g., by drilling or other method, all the way through the base 420 of the clamp 402; after inserting the first end 302 of the connecting member 106 through the hole, the doubled-over configuration 308 can be formed in the first end 302, or a knot or other feature can be formed in the first end 302 to provide a larger diameter than the diameter of the hole. Thus, the larger diameter of the double-over configuration, knot, or other feature compared to the diameter of the hole may be sufficient to prevent the first ned 302 of the connecting member 106 from disconnecting from the clamp 402.

The first, second and third pivot pins 408, 410, 412 respectively define first, second and third rotational axes 440, 442, 444. One or more of the clamp 402, lever 404 and/or push link 406 may be configured to rotate about one or more of the first, second and third rotational axes 440, 442, 444 with respect to another one or more of the clamp 402, lever 404 and/or push link 406.

In operation, the first tip fastener 104A may be removably attached to the ski tip 101A as follows. With the first tip fastener 104A arranged in the open position depicted in FIG. 5A, the distal ends 416B, 418A of the upper and lower jaws 416, 418 are positioned to straddle the ski tip 101A, such that a portion of the ski tip 101A is positioned between the distal ends 416B, 418A of the upper and lower jaws 416, 418 as depicted in FIG. 5A. A generally downward force may be applied, e.g., by a person, to the tab 430 of the lever 404 to cause the lever 404 to rotate in the direction generally denoted by the arrow 446 about the first axis of rotation 440.

With respect to the direction 446, those skilled in the art will understand, with the benefit of the present disclosure, that the direction 446 changes as the lever 404 rotates about the first axis 440. Thus, the direction 446 depicted in FIG. 5A corresponds to the instantaneous direction of rotation of the lever 404 only when the lever 404 is in the position depicted in FIG. 5A, and more generally the direction 446 represents the changing direction of the lever 404 as it rotates about the first axis 440. Various other directions of rotation are identified in FIG. 5A and will be described below with the understanding that while the directions depicted in FIG. 5A may correspond to instantaneous directions of rotation applicable for the relative positioning of the components of the first tip fastener 104A depicted in FIG. 5A, the directions more generally represent the changing directions as the components are rotated.

In some embodiments, the push link 406 and the lever 404 may be substantially rigid components. Further, as shown, the second axis 442 may be positioned above a reference plane 448 defined by the first and third axes of rotation 440, 444. The rotation of the lever 404 in the direction 446 about the first axis 440 causes the second axis 442 to move toward the reference plane 448 in the direction denoted by arrow 450.

As the second pivot pin 410 is moved towards the reference plane 448 during rotation of the lever 404 about the first axis 440, the push link 406 exerts a force on the 412 and upper jaw 416, which force is generally denoted by the arrow 452. The direction of the force 452 may vary as the push link 406 rotates about the third axis 444. The force 452 causes the distal end 416B of the upper jaw 416 to rotate substantially about a fourth axis 454 generally near the connection of the arm 416A to the base 420 by, e.g., flexing or deforming the arm 416A. The direction of rotation of the distal end 416B of the upper jaw 416 about the fourth axis 454 is denoted by arrow 456.

As the distal end 416B of the upper jaw 416 rotates about the fourth axis 454 towards the distal end 418A of the lower jaw 418, the ski tip 101A is ultimately clamped between the distal ends 416B, 418A of the upper and lower jaws 416, 418, as shown in FIG. 5B.

According to some embodiments, a stable closed position can be obtained after the second axis 442 has passed through and is positioned below the reference plane 448 defined by the first and third axes 440, 444. In particular, the components of the first tip fastener 104A may be in equilibrium with each other when the second axis 442 is positioned below the reference plane 448. Thus, in the stable closed position shown in FIG. 5B, the person who applied the force sufficient to cause the lever 404 to rotate about the first axis 440 can remove the applied force without the first tip fastener 104A returning to the open position of FIG. 5A.

At any time after the first tip fastener 104A has been attached to the ski tip 101A, the first tip fastener 104A can be removed from the ski tip 101A by a person applying a generally upward force to the tab 430 of the lever 404 to cause the lever 404 to rotate in the direction generally denoted by the arrow 458 about the first axis 440. The rotation of the lever 404 about the first axis 440 in the direction 458 may cause the second axis 442 to move in a generally upwards direction towards the reference plane 448. After the second axis 442 has passed through and is above the reference plane 448, the arm 416A may at least partially urge the first tip fastener 104A into the open position of FIG. 5A by unflexing (e.g., releasing elastic potential energy) without further application of the generally upward force to the tab 430 of the lever 404 by the person.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tip fastener configured to removably attach to a tip of a snow ski, the tip fastener comprising:
    a clamp comprising a base and opposing upper and lower jaws extending from the base;
    a lever rotatably coupled to the clamp; and
    a push link rotatably coupled to the clamp and rotatably coupled to the lever.

2. The tip fastener of claim 1, wherein:
    the base defines a base hole and the upper jaw defines an upper jaw hole;
    the lever defines a first lever hole pair and a second lever hole pair; and
    the push link defines a first push link hole and a second push link hole pair.

3. The tip fastener of claim 2, further comprising:
    a first pivot pin positioned in the first lever hole pair and the base hole, wherein the first pivot pin defines a first axis of rotation;
    a second pivot pin positioned in the second lever hole pair and the first push link hole, wherein the second pivot pin defines a second axis of rotation; and
    a third pivot pin positioned in the second push link hole pair and the upper jaw hole, wherein the third pivot pin defines a third axis of rotation.

4. The tip fastener of claim 1, further comprising a set of teeth in a distal end of the upper jaw, or a set of teeth in a distal end of the lower jaw, or a set of teeth in the distal end of each of the upper jaw and the lower jaw.

5. The tip fastener of claim 4, wherein:
    the set of teeth comprises stainless steel or aluminum overmolded into the clamp; or
    the set of teeth comprises nylon and is integrally formed in the clamp.

6. The tip fastener of claim 1, wherein the upper jaw includes an at least partially flexible arm connecting a distal end of the upper jaw to the base.

7. The tip fastener of claim 1, wherein the tip fastener comprises at least one of nylon, plastic, polymer, aluminum, or stainless steel.

8. The tip fastener of claim 1, wherein the base defines a receptacle having one end of a connecting member of a tip connector device disposed therein.

9. A tip connector device comprising:
a connecting member including opposing first and second ends;
a first tip fastener coupled to the first end of the connecting member; and
a second tip fastener coupled to the second end of the connecting member;
wherein each of the first and second tip fasteners comprises:
a clamp;
a lever rotatably coupled to the clamp; and
a push link rotatably coupled to the clamp and rotatably coupled to the lever.

10. The tip connector device of claim 9, wherein the connecting member comprises elastic cord, bungee cord, surgical tubing, metal, natural fibers, synthetic fibers, fabric, leather or wood.

11. The tip connector device of claim 9, wherein the connecting member includes a cord, tubing, cable, wire, rope, strap or dowel.

12. The tip connector device of claim 9, wherein the clamp comprises a base and opposing upper and lower jaws extending from the base.

13. The tip connector device of claim 12, wherein the clamp further comprises at least one set of teeth in a distal end of the upper jaw or the lower jaw.

14. The tip connector device of claim 12, further comprising:
a first pivot pin configured to rotatably couple the lever to the clamp, the first pivot pin defining a first axis;
a second pivot pin configured to rotatably couple the push link to the lever, the second pivot pin defining a second axis; and
a third pivot pin configured to rotatably couple the push link to the upper jaw of the clamp.

15. The tip connector device of claim 12, wherein:
the first tip fastener is configured to removably secure a tip of a skier's first ski between upper and lower jaws of the first tip fastener; and
the second tip fastener is configured to removably secure a tip of the skier's second ski between upper and lower jaws of the second tip fastener.

16. The tip connector device of claim 9, wherein:
the first tip fastener is overmolded over the first end of the connecting member; and
the second tip fastener is overmolded over the second end of the connecting member.

17. A tip connector device comprising:
a connecting member including opposing first and second ends;
a first tip fastener coupled to the first end of the connecting member, the first tip fastener comprising:
a first clamp comprising a base and opposing upper and lower jaws extending from the base of the first clamp;
a first lever rotatably coupled to the first clamp;
a first push link rotatably coupled to the first clamp and rotatably coupled to the first lever;
a first pivot pin rotatably coupling the first lever to the first clamp;
a second pivot pin rotatably coupling the first push link to the first lever; and
a third pivot pin rotatably coupling the first push link to the upper jaw of the first clamp;
a second tip fastener coupled to the second end of the connecting member, the second tip fastener comprising:
a second clamp comprising a base and opposing upper and lower jaws extending from the base of the second clamp;
a second lever rotatably coupled to the second clamp;
a second push link rotatably coupled to the second clamp and rotatably coupled to the second lever;
a fourth pivot pin rotatably coupling the second lever to the second clamp;
a fifth pivot pin rotatably coupling the second push link to the second lever; and
a sixth pivot pin rotatably coupling the second push link to the upper jaw of the second clamp.

18. The tip connector device of claim 17, wherein:
the first pivot pin is positioned in a first lever hole pair defined in the first lever and a base hole defined in the base of the first clamp;
the second pivot pin is positioned in a second lever hole pair defined in the first lever and a first push link hole defined in the first push link;
the third pivot pin is positioned in a second push link hole pair defined in the first push link and an upper jaw hole defined in the upper jaw of the first clamp;
the fourth pivot pin is positioned in a first lever hole pair defined in the second lever and a base hole defined in the base of the second clamp;
the fifth pivot pin is positioned in a second lever hole pair defined in the second lever and a first push link hole defined in the second push link; and
the sixth pivot pin is positioned in a second push link hole pair defined in the second push link and an upper jaw hole defined in the upper jaw of the second clamp.

19. The tip connector device of claim 17, wherein:
the first clamp further comprises two sets of teeth, each positioned in the lower jaw of the first clamp; and
the second clamp further comprises two sets of teeth, each positioned in the lower jaw of the second clamp.

20. The tip connector device of claim 17, wherein:
the first tip fastener is configured to removably secure a tip of a skier's left ski between upper and lower jaws of the first tip fastener; and
the second tip fastener is configured to removably secure a tip of the skier's right ski between upper and lower jaws of the second tip fastener.

* * * * *